C. GENTLE.
TRUCK.
APPLICATION FILED JAN. 11, 1910.
978,015.
Patented Dec. 6, 1910.
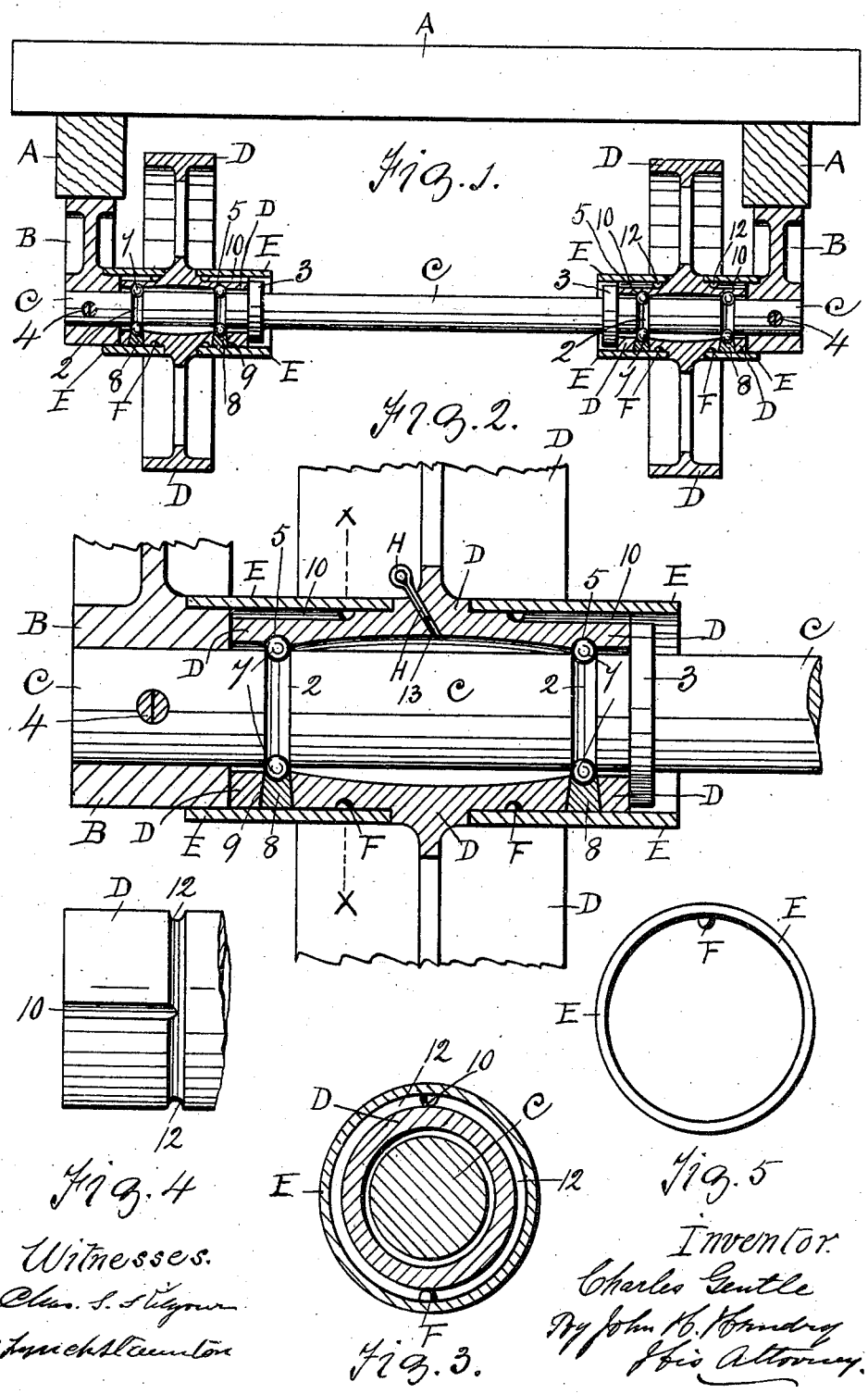
Witnesses.
Inventor.
Charles Gentle
By John B. Kennedy
His Attorney.

UNITED STATES PATENT OFFICE.

CHARLES GENTLE, OF HAMILTON, ONTARIO, CANADA.

TRUCK.

978,015.

Specification of Letters Patent.   Patented Dec. 6, 1910.

Application filed January 11, 1910. Serial No. 537,478.

*To all whom it may concern:*

Be it known that I, CHARLES GENTLE, a subject of the King of Great Britain, and resident of Hamilton, in the county of Wentworth, in the Province of Ontario, Canada, have invented new and useful Improvements in Trucks, of which the following is a specification.

My invention relates to improvements in trucks, and consists of an axle held stationary in bearings secured to the underside of the frame of a truck, wheels adapted to revolve on ball bearings on said axle, and removable means on the hubs of the wheels to retain the balls in position and to prevent dust from entering into the ball bearings.

The objects of my invention are first to provide a truck which will run smoothly and steadily on ball bearings on a stationary axle, second, to provide removable means whereby the balls may be admitted to position, and removed when necessary without the aid of tools, third, to provide removable means to retain the balls in position and to prevent dust from entering the ball bearings, fourth to afford facilities for securing the axle to the axle brackets on the truck, and for removing the axle from the truck.

I attain these objects by the mechanism illustrated in the accompanying drawing in which:—

Figure 1 is a sectional end elevation of ball bearing wheels on a stationary axle in brackets secured to the frame of a truck. Fig. 2 is an enlarged sectional end elevation of the hub part of a wheel on ball bearings on an end part of an axle which is secured to a bracket on the frame of a truck. Fig. 3 is an enlarged section of the axle, the hub of the wheel and the retaining band on the hub, through the broken vertical line X, X, of Fig. 2 of the drawing. Fig. 4 is an enlarged plan of an end part of the hub of a wheel, showing a longitudinal and an annular groove in the same. Fig. 5 is an enlarged end elevation of one of the bands detached from the hub of the wheel showing a teat in the interior thereof, said teat adapted to fit the grooves in the hub.

Similar letters refer to similar parts throughout the several views.

In the drawing A is the frame of a truck, and B, are brackets rigidly secured to the underside thereof, and transversely opposite one to the other.

C is the axle, having annular ball bearing grooves 2, and collars 3. The end parts of the axle are supported in the brackets B, and held rigidly therewith, by means of split pins 4, which pass through the axle and the brackets, and extend beyond, as is common in split pins, for withdrawal purposes. The pins 4, also prevent lateral movement of the axle, and any possible friction between the bracket and the end of the ferrule.

D, are the wheels, the central bores of the hubs of the wheels, are larger in diameter than the axle, in order to revolve free of the axle. Both wheels D, and the parts connected therewith, are identical in construction, therefore the description of one wheel, will be sufficient.

In the bore of the hub of the wheel, are interior grooves 5, which conform to and with the annular grooves 2 in the axle, and in which are a number of balls 7. Removable tapered plugs 8, are inserted in the tapered openings 9, of the hub and immediately opposite to the grooves 2 and 5. The outer ends of the plugs conform to the periphery of the hub, and fit snugly in the openings 9, and the inner ends of the plugs are concave to conform to the roundness of the balls and contact with the balls when in position. The outer ends of the plugs are flush with the peripheries of the hubs, and are removable without the aid of any tool. The bearing, or round hub part of the bracket B, extends beyond the bracket and is of the same diameter as the hub of the wheel, and loosely contacts with said hub so as to avoid friction when the wheel revolves. The collar 3 on the axle is in proximity with the inner end of the hub and loosely contacting therewith to avoid friction between said hub and collar.

E and E are similar bands, or ferrules, and fit snugly on the hub of the wheel, and one of the ferrules extends on the bearing of the bracket B, and rotates freely on said bearing. Each of the ferrules E, is provided with an inwardly projecting teat F. The hub of the wheel has horizontal grooves 10, extending from the ends of the hubs to the annular grooves 12, which are shown in Fig. 4, of the drawing. The teat F in the ferrule is adapted to slide in the longitudinal groove 10, and find its rest in the annular groove 12. The ferrule may then be revolved one half revolution, with its teat in the annular groove and there remain in order to lock the plugs 8 and thereby to retain the balls. When the ferrules are brought back until the teat F comes to the groove 10 then the ferrules may be removed, thereby releasing the plugs 8 and the balls 7. The ferrules contact with and retain the tapered plugs 8 in position, and also cover the joining of the hub of the wheel, with the bracket B, and the opposite end of said hub with the collar 3, of the axle, and thereby preventing any dust from entering the ball bearings.

The central part of the hub of the wheel has an oblique oil hole 13, which is provided with a removable split pin H, which when withdrawn, oil may be admitted to the axle and thence to the ball bearings, and the pin again inserted. The split in the pin 4, and in the pin H, allow the pins to spread, and thereby prevent said pins from working loose in the truck when in use.

It will be noticed, that in this invention, all the parts may be made and assembled together, and subject to be taken apart, for shipping, and other purposes, without the aid of tools.

What I claim as my invention and desire to secure by Letters Patent, is:—

1. In a truck, a frame, an axle rigid therewith, a wheel adapted to rotate loosely on ball bearings on the axle, a removable tapered plug through one side of the hub of the wheel to admit balls to position, a longitudinal groove, and an annular groove communicating with each other on said hub, a ferrule having a teat on its inner side and adapted to slide on the hub and plug, and said teat to slide in the longitudinal groove, and then to rotate and lock in said annular groove, to retain the plug, and to partially cover the bearing of the axle.

2. In a truck, a frame, bracket bearings rigid therewith, a stationary axle in the bearings, annular grooves in the axle, a wheel on the axle having grooves opposite to and corresponding to the annular grooves, a removable tapered plug in the hub of said wheel and opposite to said grooves, a collar on the axle adjoining the hub, a ferrule adapted to slide on the hub and the collar, a longitudinal and an annular groove on the hub, a teat on the ferrule adapted to slide in the longitudinal groove, and to rotate a distance in the annular groove, and to lock therein, and thereby lock the plug and cover the collar, to prevent dust from entering the ball bearings.

CHARLES GENTLE.

Witnesses:
JOHN H. HENDRY,
M. LYNCH STAUNTON.